Aug. 30, 1932.  W. E. WEAVER  1,874,396
RESILIENT WHEEL
Filed March 7, 1930
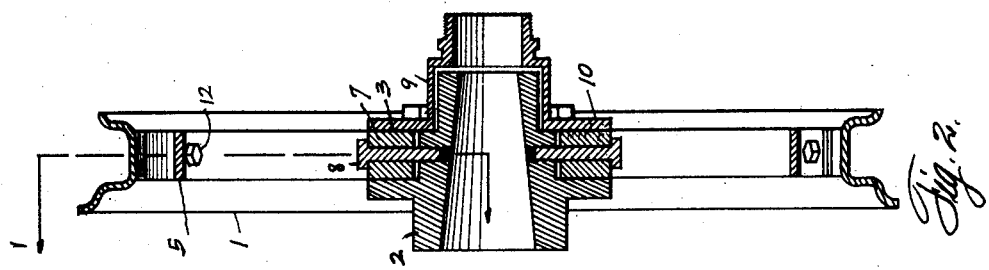
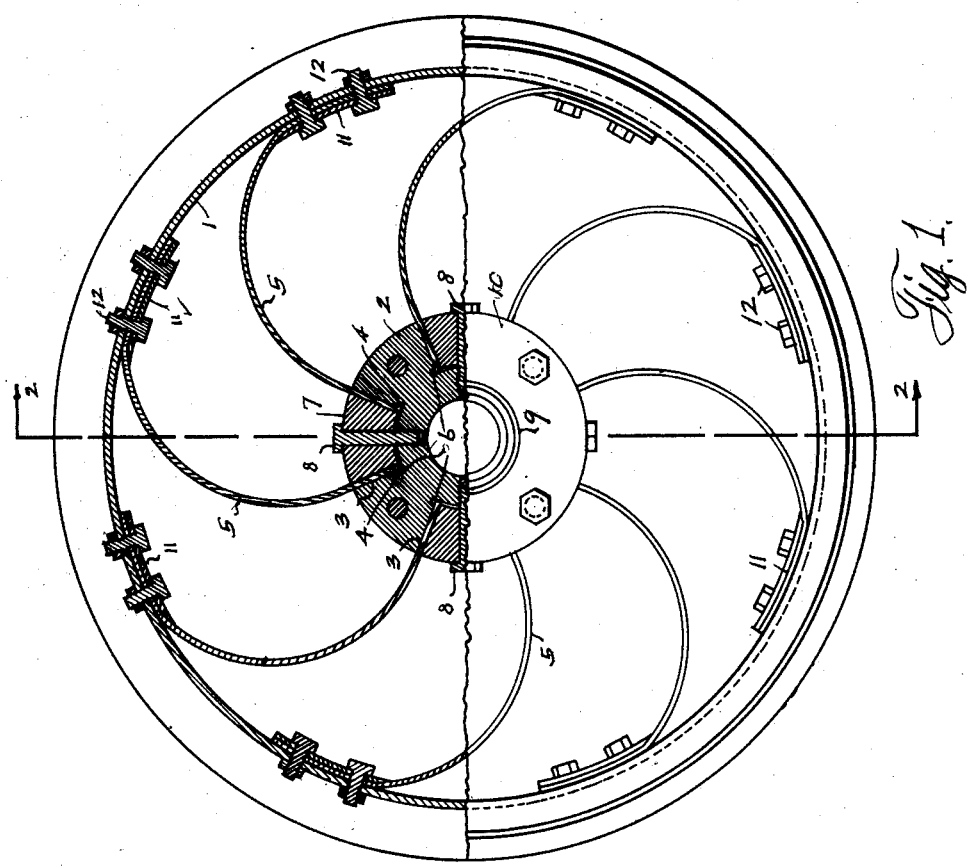
Inventor
Walter E. Weaver
By Hardway Cather
Attorneys Patented Aug. 30, 1932

1,874,396

UNITED STATES PATENT OFFICE

WALTER E. WEAVER, OF HOUSTON, TEXAS, ASSIGNOR OF ONE-HALF TO HARRY L. KAUF-HOLD, OF HARRIS COUNTY, TEXAS

RESILIENT WHEEL

Application filed March 7, 1930. Serial No. 434,091.

This invention relates to new and useful improvements in a resilient wheel.

One object of the invention is to provide a resilient wheel of the character described specially designed for use on vehicles such as motor vehicles and by the use of which the ordinary pneumatic tire may be dispensed with, if desired, and a solid tire used.

Another object of the invention is to provide a wheel of the character described having a novel type of spokes secured in a novel manner to the hub and to the wheel felly.

With the above and other objects in view, the invention has particular relation to certain novel features of construction, operation and arrangement of parts, an example of which is given in this specification and illustrated in the accompanying drawing wherein:—

Figure 1 shows a side elevation of the wheel, partly in section, taken on the line 1—1 of Figure 2, and Figure 2 shows a sectional view of the wheel taken on the line 2—2 of Figure 1.

Referring now more particularly to the drawing, wherein like numerals of reference designate similar parts in each of the figures the numeral 1 designates a wheel felly of any selected type. The numeral 2 designates a wheel hub of any conventional contour and this hub has the spaced peripheral pockets 3 having the oppositely disposed grooves 4 at the bottom disposed substantially parallel with the axis of the hub. These pockets converge inwardly and the inner ends of the spokes 5 are seated therein and are provided with the beads as 6 which fit into said grooves. Wedges, as 7, are fitted into said pockets, between the corresponding spokes and are secured in such position by means of the set bolts 8 whose inner ends are threaded into the hub. These wedges hold the inner ends of the spokes securely clamped in place. Fitted over the outer end of the hub there is an outer end hub cap 9 having the annular flange 10 which is bolted to the hub and which abuts against the outer ends of the wedges 7 and holds them securely in place. The spokes 5 are arcuate in form and are flexible and their outer ends lie against the inner side of the felly 1. Reinforcing plates 11 are fitted against the inner sides of said outer ends and said plates and spoke ends are secured to the felly by means of suitable bolts 12.

A tire rim, with a tire thereon may be mounted on the felly in any improved manner.

The drawing and description disclose what is now considered to be a preferred form of the invention by way of illustration only, while the broad principle of the invention will be defined by the appended claim.

What I claim is:

A resilient wheel including a hub having spaced peripheral inwardly converging pockets each open on a lateral side and provided with oppositely disposed grooves substantially parallel with the axis of the hub, yieldable spokes whose inner ends are fitted into each pocket, said spokes having beads which fit into said grooves, wedges fitted snugly in said pockets between the corresponding spokes, set bolts fitted through said wedges and whose inner ends are threaded into the hub, a hub cap having an annular flange which is bolted to the hub and which closes the lateral open side of each of said pockets and abuts the outer ends of the wedges and a felly secured to the outer ends of said spokes.

In testimony whereof I have signed my name.

WALTER E. WEAVER.